(12) United States Patent
Voss et al.

(10) Patent No.: US 10,207,928 B2
(45) Date of Patent: Feb. 19, 2019

(54) COMBINED MEMBRANE-PRESSURE SWING ADSORPTION METHOD FOR RECOVERY OF HELIUM

(71) Applicant: LINDE AKTIENGESELLSCHAFT, Munich (DE)

(72) Inventors: Christian Voss, Geretsried (DE); Akos Tota, München (DE); Martin Bauer, München (DE); Frank Jennewein, München (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/527,821

(22) PCT Filed: Dec. 7, 2015

(86) PCT No.: PCT/EP2015/002464
§ 371 (c)(1),
(2) Date: May 18, 2017

(87) PCT Pub. No.: WO2016/096104
PCT Pub. Date: Jun. 23, 2016

(65) Prior Publication Data
US 2017/0320736 A1    Nov. 9, 2017

(30) Foreign Application Priority Data

Dec. 17, 2014  (DE) .................. 10 2014 018 883
Mar. 24, 2015  (EP) .................................. 15000862

(51) Int. Cl.
*B01D 53/22* (2006.01)
*C01B 23/00* (2006.01)
(Continued)

(52) U.S. Cl.
CPC ........ *C01B 23/0042* (2013.01); *B01D 53/047* (2013.01); *B01D 53/226* (2013.01);
(Continued)

(58) Field of Classification Search
CPC .... B01D 53/047; B01D 53/22; B01D 53/226; B01D 53/229; B01D 2256/18;
(Continued)

(56) References Cited

U.S. PATENT DOCUMENTS 4,675,030 A  *  6/1987  Czarnecki ............ B01D 53/226
                                                  95/39
4,701,187 A  *  10/1987  Choe .................... B01D 53/226
                                                  95/53
(Continued)

FOREIGN PATENT DOCUMENTS

DE         102007022963 A1     11/2008

*Primary Examiner* — Jason M Greene
(74) *Attorney, Agent, or Firm* — Millen White Zelano & Branigan, PC

(57) ABSTRACT

A method of obtaining helium from a process gas. The process gas is at a pressure less than 15 bar to a first membrane separation stage having a first membrane more readily permeable for helium than for at least one other component in the process gas. A first retentate stream is fed to a second membrane separation stage having a second membrane more readily permeable for helium than for at least one other component in the process gas. Helium is separated from a first helium-containing permeate stream using a pressure swing adsorption to obtain a helium-containing product stream. A second helium-containing permeate stream is recycled to the first membrane separation stage. A purge gas from the pressure swing adsorption is also recycled to the first membrane separation stage.

20 Claims, 1 Drawing Sheet

(51) Int. Cl.
*B01D 53/047* (2006.01)
*B01D 51/10* (2006.01)

(52) U.S. Cl.
CPC ........ *B01D 53/229* (2013.01); *C01B 23/0094* (2013.01); *B01D 51/10* (2013.01); *B01D 2256/18* (2013.01); *B01D 2257/108* (2013.01); *B01D 2257/204* (2013.01); *B01D 2257/206* (2013.01); *B01D 2257/30* (2013.01); *B01D 2257/40* (2013.01); *B01D 2257/504* (2013.01); *B01D 2257/553* (2013.01); *B01D 2258/0216* (2013.01); *B01D 2259/40001* (2013.01); *C01B 2210/001* (2013.01); *C01B 2210/007* (2013.01); *C01B 2210/0031* (2013.01); *C01B 2210/0051* (2013.01); *C01B 2210/0053* (2013.01); *C01B 2210/0076* (2013.01); *C01B 2210/0096* (2013.01); *C01B 2210/0098* (2013.01); *Y02C 10/08* (2013.01); *Y02C 10/10* (2013.01); *Y02P 20/152* (2015.11); *Y02P 20/154* (2015.11)

(58) Field of Classification Search
CPC ........ B01D 2258/0216; B01D 2317/02; B01D 2317/022; C01B 23/0042; C01B 23/0052; C01B 2210/001; C01B 2210/0014; C01B 2210/0031
See application file for complete search history.

(56) References Cited

U.S. PATENT DOCUMENTS

| | | | | |
|---|---|---|---|---|
| 4,717,407 A | * | 1/1988 | Choe | B01D 53/229 210/500.21 |
| 5,224,350 A | * | 7/1993 | Mehra | B01D 53/229 62/624 |
| 5,632,803 A | * | 5/1997 | Stoner | B01D 53/229 95/101 |
| 5,837,125 A | * | 11/1998 | Prasad | B01D 53/226 205/763 |
| 6,179,900 B1 | * | 1/2001 | Behling | B01D 53/04 95/102 |
| 2004/0237789 A1 | * | 12/2004 | Baksh | B01D 53/047 96/131 |
| 2005/0217479 A1 | | 10/2005 | Hale et al. | |
| 2014/0345457 A1 | | 11/2014 | Balster et al. | |
| 2016/0115029 A1 | * | 4/2016 | Van Leuvenhaege | B01D 53/229 423/262 |

* cited by examiner

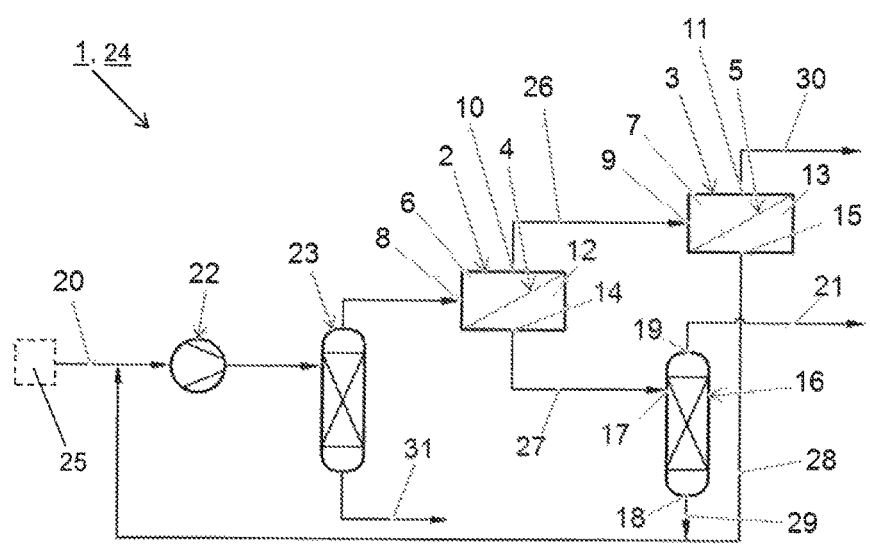

COMBINED MEMBRANE-PRESSURE SWING ADSORPTION METHOD FOR RECOVERY OF HELIUM

The invention relates to a method of recovering helium from a process gas.

The prior art discloses various methods of obtaining or recovering helium (especially pure helium) from a helium-containing gas, or concentrating the helium content. For example, EP 1 427 508 A1 discloses a combined membrane adsorption method for recovery of helium. In this case, helium (especially pure helium) used is contaminated by an application. The contaminated helium is subsequently subjected to adsorptive purification.

In addition, U.S. Pat. No. 5,632,803 A discloses a method in which a helium-enriched permeate stream is obtained from a process gas at elevated pressure in a first step by means of a membrane separation stage. In a first pressure swing adsorption, the permeate stream is subsequently concentrated to about 50% by volume of helium. A second pressure swing adsorption is then used to obtain a helium product having a purity of more than 95% by volume from this concentrated stream.

There are also known methods in which purely adsorptive or cryogenic approaches are pursued. These are frequently methods which serve merely for concentration of helium.

Helium is of great significance for many applications, but is generally only available in diluted form, for example in natural gas or purge gases from various production methods. Because helium is a finite raw material, methods by which helium can be obtained or recovered are of increasing economic significance. It is therefore necessary to find a method by which helium can be obtained/recovered with high purity but simultaneously high yield.

Proceeding from this, the problem addressed by the present invention is that of providing a process by which helium is obtainable with preferably high purity with a simultaneously high yield. The features of the invention are described hereinafter. The features of the invention can be combined in any technically viable manner, for which it is also possible to refer to the elucidations from the description which follows and features from the drawing FIGURE comprising supplementary configurations of the invention.

The problem addressed by the invention is solved in that a method of obtaining helium from a helium-containing process is described, which is especially conducted using a plant according to the invention, and which at least comprises the following steps:

a. feeding a helium-containing process gas having a pressure of less than 15 bar, preferably of less than 10 bar, to a compression which compresses the process gas by means of a compressor prior to introduction into the first membrane separation stage. More particularly, no further compressor is provided in the plant;

b. feeding the process gas that leaves the compression to a prepurifying unit in which the troublesome components such as $SF_6$ or $NF_3$, a metal hydride, are removed;

c. guiding the process gas removed from the troublesome components to a first membrane separation stage having a first membrane which is more readily permeable for helium than for at least one further component present in the process gas (e.g. nitrogen, $CO_2$, Ar, $O_2$, methane, see also above), producing a first retentate stream and a first permeate stream, with helium depleted in the first retentate stream and enriched in the first permeate stream;

d. guiding the first retentate stream including components retained by the first membrane to a second membrane separation stage having a second membrane which is more readily permeable for helium than for at least one further component present in the process gas (e.g. nitrogen and/or methane, see above), producing a second retentate stream and a second permeate stream, with helium depleted in the second retentate stream and enriched in the second permeate stream;

e. removing helium from the first helium-containing permeate stream including components that have passed through the first membrane by means of pressure swing adsorption to produce a helium-containing product stream especially having a high helium content; and f. recycling the second helium-containing permeate stream including components that have passed through the second membrane to the first membrane separation stage, and recycling a purge gas from the pressure swing adsorption to the first membrane separation stage, the purge gas especially having been used beforehand for purging of an adsorber used in the pressure swing adsorption.

The two membrane separation stages can of course also be operated by means of a sweep gas. For this purpose, for example, it is possible to provide one sweep gas inlet on each permeate side.

The at least one membrane of the particular membrane separation stage has better, i.e. higher, permeability for helium than for at least one other component present in the process gas stream. Preferably, the permeability of the particular membrane is at its highest for helium and lower for all other components of the process gas. Such an other component or a corresponding gas molecule may especially be nitrogen ($N_2$), carbon dioxide ($CO_2$), argon (Ar), oxygen ($O_2$) or methane ($CH_4$). The helium correspondingly accumulates in the particular permeate stream, while it is depleted in the particular retentate stream.

In an advantageous embodiment, the process gas is also conducted through a prepurifying unit which serves to remove components that are troublesome in the downstream process in the process gas. The prepurifying unit is provided downstream of the compressor and upstream of the first membrane separation stage. The prepurifying unit preferably has at least one of the following functional units:
- a temperature swing adsorption unit,
- a reactor for conducting a reaction for removing the troublesome component(s) from the process gas (e.g. a non-regeneratable ad- or chemisorption unit (called a guard bed)).
- In principle, however, it is also possible to use a catalyst for conversion of trace components (e.g. oxidation of $H_2$, $SiH_4$, hydrocarbons).

The prepurifying unit is preferably set up to remove at least one of the following troublesome components: $H_2$, hydrocarbons, $H_2O$, $CO_2$, ammonia, sulphur compounds, fluorine gases ($SF_6$, $NF_3$), silanes, phosphines/arsine, halogenated hydrocarbons ($CF_4$, etc.), metal hydrides etc., which are used, for example, in chemical vapour deposition and alternative methods.

For adsorptive removal of the impurities, one or more non-regeneratable adsorbers (called guard beds) is/are used as prepurifying unit upstream of the first membrane separation stage. Alternatively, it is possible to use a temperature swing adsorption (TSA) with at least two adsorbers. In this case, the process stream is first guided into a first adsorber in which the adsorption of troublesome components is conducted. Other adsorbers are being regenerated or are on standby. The gas from the first adsorber, in order to achieve high bed exploitation with simultaneously high purity, can be guided into a downstream adsorber which is not to be regenerated, into the guard bed. The arrangement of a prepurifying unit (especially TSA and/or guard bed) upstream of the membrane separation stages protects the membranes from impurities.

In the method according to the invention, preferably two and especially exactly two membrane separation stages are used, in which case preferably only the first membrane separation stage is arranged as a preliminary stage to the pressure swing adsorption unit for processing the product gas, i.e. (pure) helium, from the helium-containing gas supplied. The second membrane separation stage, by contrast, preferably provides a permeate gas for recycling to the first membrane separation stage.

A first retentate stream conduit arranged between the first membrane separation stage and the second membrane separation stage thus connects the first retentate outlet of the first membrane separation stage to the second product gas inlet of the second membrane separation stage.

A first permeate stream conduit arranged between the first membrane separation stage and the pressure swing adsorption unit connects the first permeate stream outlet of the first membrane separation stage to the third product gas inlet of the pressure swing adsorption unit. The pressure swing adsorption unit in this case especially has at least two adsorbers, such that one adsorber can always be in adsorptive operation, while the other adsorber can be regenerated, for which purpose the pressure in the adsorber is lowered and the adsorber is purged with a purge gas. It is thus possible to run the adsorption process continuously. Other modes of operation are also conceivable.

There is at least one first recycle conduit arranged between the second permeate stream outlet of the second membrane separation stage and the feed conduit, through which the (second) permeate stream can be recycled from the second membrane separation stage into the feed conduit or into the first membrane separation stage. In this case, the second permeate stream is thus fed to the process stream, and so the helium content of the process stream to the first membrane separation stage is correspondingly increased. There is a second recycle conduit arranged between the purge gas outlet and the feed conduit or the first recycle conduit, through which the purge gas can be fed to the process gas. This distinctly increases the yield, since He gets into the tail gas in the course of regeneration of the adsorbers, and this would be lost without the recycling. The second retentate stream outlet removes the fraction of gas which has not passed through the at least one second membrane, i.e. has ultimately remained on the second retentate side, as offgas. This fraction has only a very low helium content, preferably less than 0.1% by volume of helium.

In the first membrane separation stage, the permeate stream preferably has a helium content of 20% by volume or more. The pressure swing adsorption subsequently enables a helium content of more than 95% by volume, preferably of more than 99% by volume. Membrane materials used for the membranes of the first and second membrane separation stages are preferably polyimides (PI), polysulphones (PSf) or polyaramids (PA). The temperatures in the two membrane separation stages and in the pressure swing and temperature swing adsorption are preferably within a range from 0° C. to 120° C., preferably within a range from 20° C. to 60° C. The inlet streams into the two membrane separation stages or into the temperature swing adsorption preferably have a pressure in the range from 10 bar to 80 bar, preferably in the range from 15 bar to 60 bar. The inlet stream into the pressure swing adsorption preferably has a pressure in the range from 5 bar to 20 bar. The outlet pressure is especially 0 bar to 3 bar lower in each case than the respective inlet pressure.

By removing a majority of the helium of the retentate stream of the first membrane separation stage as permeate stream in the second membrane separation stage, a high yield is achieved, i.e. a retentate stream having a very low helium content is discharged from the process. The process is especially intended for recovery of helium from process gases or offgas streams at atmospheric pressure or a slightly elevated pressure of preferably up to 15 bar. It is particularly suitable for recovering helium from offgas streams from manufacturing processes, especially in the electronics industry and in the semiconductor industry.

The recycle stream from the second membrane separation stage (second permeate stream) and the recycle stream from the pressure swing adsorption unit (purge gas) is preferably introduced into the feed conduit to the first membrane separation stage upstream of the compressor.

The process proposed here is particularly suitable for being executed in a plant according to the invention or a helium recovery plant according to the above description. A characteristic feature in this process is that the second permeate stream from the second membrane and also the purge gas stream from the pressure swing adsorption can be recycled into the first membrane separation stage.

In this case, the first membrane separation stage preferably produces a first permeate stream having a helium content of 25% by volume or more. At the product gas outlet of the pressure swing adsorption, a product gas or helium gas having a purity of 95% by volume or more is produced, preferably of 99% by volume or more. In addition, the second retentate stream is especially discarded or sent to a further use (see below).

In a further advantageous embodiment of the process, the process gas is (especially exclusively) compressed upstream of the first membrane separation stage (preferably to a pressure in the range from 15 bara to 60 bara). It is thus especially possible to provide only one (optionally multistage) compression of the process gas in the method according to the invention. As a result, the capital and operating costs for this process are correspondingly comparatively low.

In a further advantageous embodiment of the process, upstream of the first membrane separation stage and especially downstream of said compression, the process gas is freed of any troublesome components, preferably by means of a temperature swing adsorption and/or another reaction (for example in an adsorber and/or reactor). In a further advantageous configuration of the method according to the invention, the process gas from which helium is to be recovered is a manufacturing offgas from a manufacturing process for production of an electronic element and/or semiconductor element, especially with removal of at least one of the following components of the process gas in said prepurification: $H_2$, hydrocarbons, $H_2O$, $CO_2$, sulphur compounds, silanes, phosphines/arsine, halogenated hydrocarbons, fluorine gases ($SF_6$, $NT_3$), metal hydrides etc.

In a further advantageous configuration of the method according to the invention, the second retentate stream including components retained by the second membrane is used for regeneration of one (or more) adsorber(s) used in the temperature swing adsorption (see above).

In addition, the second retentate stream which has not passed through the second membrane can be expanded to perform work, especially with generation of electrical energy.

With regard to the recycling of the second permeate stream into the first membrane separation stage and the recycling of the purge gas into the first membrane separation stage, it may not be necessary to recycle the entirety of each stream. It is also conceivable to recycle just a substream in each case into the first membrane separation stage.

The invention described above is elucidated in detail hereinafter against the technical background in question with reference to the accompanying drawing FIGURE, which show preferred embodiments.

The drawing FIGURE schematically shows a method according to the invention for separating helium from a process gas and a helium separation plant according to the invention.

The drawing FIGURE shows a plant 1 according to the invention. If a process gas to be treated is an offgas from a manufacturing process or a manufacturing line 25, especially for production of electronic elements and/or semiconductor elements, the plant is also referred to as helium recovery plant 24 and may comprise the manufacturing process or the manufacturing line 25.

The process gas/offgas is fed to a compressor 22 via a feed conduit 20 and is compressed therein and optionally prepurified downstream of the compressor 22, especially by means of a temperature swing adsorption 23. Subsequently, the optionally prepurified process gas is fed via a first process gas inlet 8 to a first membrane separation stage 2, specifically on the first retentate side 6. A process gas fraction having a high helium content which can pass through the first membrane 4 arrives on the first permeate side 12 and exits there as the first permeate stream via the first permeate stream outlet 14 and is fed to the pressure swing adsorption unit 16 via the first permeate stream conduit 27.

The proportion of the process gas which does not pass through the first membrane 4 in the first membrane separation stage 2, i.e. is ultimately retained by the membrane 4, remains on the first retentate side 6 and is discharged as first retentate stream via the first retentate stream outlet 10. Via the first retentate stream conduit 26, the first retentate stream is then introduced via the second process gas inlet 9 into the second membrane separation stage 3, namely to the second retentate side 7. The process gas which passes through the second membrane 5 arrives on the second permeate side 13 and flows through the second permeate outlet 15 as the second permeate stream into the first recycle conduit 28, through which the second permeate stream is fed back to the feed conduit 20 or to the first membrane separation stage 2, preferably upstream of the compressor 22.

The process gas component in the second membrane separation stage 3 which does not pass through the second membrane 5 is removed as the second retentate stream through the second retentate stream outlet 11 and the first offgas conduit 30. This (low-helium) offgas can especially be used for purging adsorbers of the temperature swing adsorption 23.

The first permeate stream is introduced into the pressure swing adsorption unit 16 via the first permeate stream conduit 27 and via the third process gas inlet 17. A purge gas obtained in the pressure swing adsorption is introduced back into the feed conduit 20 or the first membrane separation stage 2, preferably upstream of the compressor 22, via the purge gas outlet 18 and via the second recycle conduit 29, here by means of the first recycle conduit 28. The first permeate stream which has been purified further by pressure swing adsorption is dispensed via the product gas outlet 19 as product gas or pure helium gas, preferably with a helium content of more than 95% by volume, more preferably more than 99% by volume, and can be sent to a further use via the product gas conduit 21. A tail gas from the temperature swing adsorption 23 is removed via a second offgas conduit 31.

LIST OF REFERENCE NUMERALS

| | |
|---|---|
| 1 | Helium separation plant |
| 2 | First membrane separation stage |
| 3 | Second membrane separation stage |
| 4 | First membrane |
| 5 | Second membrane |
| 6 | First retentate side |
| 7 | Second retentate side |
| 8 | First process gas inlet |
| 9 | Second process gas inlet |
| 10 | First retentate stream outlet |
| 11 | Second retentate stream outlet |
| 12 | First permeate side |
| 13 | Second permeate side |
| 14 | First permeate stream outlet |
| 15 | Second permeate stream outlet |
| 16 | Pressure swing adsorption unit |
| 17 | Third process gas inlet |
| 18 | Purge gas outlet |
| 19 | Product gas outlet |
| 20 | Feed conduit |
| 21 | Product gas conduit |
| 22 | Compressor stage |
| 23 | Prepurifying unit |
| 24 | Helium recovery plant |
| 25 | Manufacturing line |
| 26 | First retentate stream conduit |
| 27 | First permeate stream conduit |
| 28 | First recycle conduit |
| 29 | Second recycle conduit |
| 30 | First offgas conduit |
| 31 | Second offgas conduit |

The invention claimed is:

1. A method for obtaining helium from a helium-containing process gas, said method comprising:
   a) feeding a helium-containing process gas having a pressure of less than 15 bar to a compression,
   b) feeding the process gas that leaves the compression to a prepurifying unit in which troublesome components are removed;
   c) guiding the process gas from the troublesome components have been removed to a first membrane separation stage having a first membrane which is more readily permeable for helium than for at least one further component present in the process gas;
   d) guiding a first retentate stream that has not passed through the first membrane to a second membrane separation stage having a second membrane which is more readily permeable for helium than for at least one further component present in the process gas;
   e) separating helium from a first helium-containing permeate stream that has passed through the first membrane by means of pressure swing adsorption to produce a helium-containing product stream; and
   f) recycling a second helium-containing permeate stream that has passed through the second membrane to the first membrane separation stage, and recycling a purge gas from the pressure swing adsorption to the first membrane separation stage.

2. The method according to claim 1, wherein a temperature swing adsorption is conducted in the prepurifying unit.

3. The method according to claim 1, wherein the process gas is a manufacturing offgas from a manufacturing process for production of an electronic and/or semiconductor element, the troublesome components to be removed in said prepurification including at least one of the following components: $H_2$, a hydrocarbon, $H_2O$, $CO_2$, a sulphur compound, a silane, a phosphine, arsine, a halogenated hydrocarbon, a fluorine gas, and a metal hydride.

4. The method according to claim 2, wherein a second retentate stream that has not passed through the second membrane is used for regeneration of an adsorber used in the temperature swing adsorption.

5. The method according to claim 1, wherein a second retentate stream that has not passed through the second membrane is expanded to perform work.

6. The method according to claim 1, wherein the helium content of the first permeate stream is not less than 25% by volume, and/or in that the helium content of the product stream is not less than 95% by volume.

7. The method according to claim 1, wherein the helium-containing process gas has a helium content of more than 0.1% by volume.

8. The method according to claim 1, wherein the helium-containing process gas is fed to the compression in a) at a pressure of less than 10 bar.

9. The method according to claim 1, wherein a reaction is conducted in the prepurifying unit.

10. The method according to claim 1, wherein a thermal oxidation is conducted in the prepurifying unit.

11. The method according to claim 1, wherein a second retentate stream that has not passed through the second membrane is expanded to electrical energy.

12. The method according to claim 1, wherein the helium content of the first permeate stream is not less than 25% by volume, and/or in that the helium content of the product stream is not less than 99% by volume.

13. The method according to claim 1, wherein the helium-containing process gas has a helium content of more than 0.5% by volume.

14. The method according to claim 1, wherein the membrane materials used for the membranes of the first and second membrane separation stages are selected from polyimides, polysulphones and polyaramids.

15. The method according to claim 1, wherein the operating temperatures in the first and second membrane separation stages are within the range from 0° C. to 120° C.

16. The method according to claim 2, wherein the operating temperature in the temperature swing adsorption is within the range from 0° C. to 120° C.

17. The method according to claim 16, wherein the operating temperatures in the first and second membrane separation stages are within the range from 0° C. to 120° C.

18. The method according to claim 2, wherein the inlet streams into the two membrane separation stages or into the temperature swing adsorption have a pressure in the range from 10 bar to 80 bar.

19. The method according to claim 1, wherein the inlet stream into the pressure swing adsorption has a pressure in the range from 5 bar to 20 bar.

20. The method according to claim 1, wherein the second helium-containing permeate stream and the purge gas from the pressure swing adsorption are recycled to a point upstream of the compression.

* * * * *